H. E. BRICE.
WEATHER STRIP FOR DOORS.
APPLICATION FILED DEC. 5, 1919.

1,381,963.

Patented June 21, 1921.

INVENTOR.
HERBERT E. BRICE.

UNITED STATES PATENT OFFICE.

HERBERT EDWARD BRICE, OF TORONTO, ONTARIO, CANADA.

WEATHER-STRIP FOR DOORS.

1,381,963.   Specification of Letters Patent.   Patented June 21, 1921.

Application filed December 5, 1919. Serial No. 342,795.

*To all whom it may concern:*

Be it known that I, HERBERT EDWARD BRICE, a subject of the King of Great Britain, residing at 470 Roncesvalles avenue, in the city of Toronto, in the county of York, in the Province of Ontario, Canada, have invented certain new and useful Improvements in Weather-Strips for Doors, of which the following is the specification.

My invention relates to improvements in weather strips for doors and the object of the invention is to devise a simple automatic means operated by the closing of the door for carrying the weather strip carried by the door into contact with the floor and for releasing it from the floor as the door is opened, and it consists essentially of the arrangement and construction of parts as hereinafter more particularly explained.

In the drawings like characters of reference indicate corresponding parts in the various figures.

Figure 1:
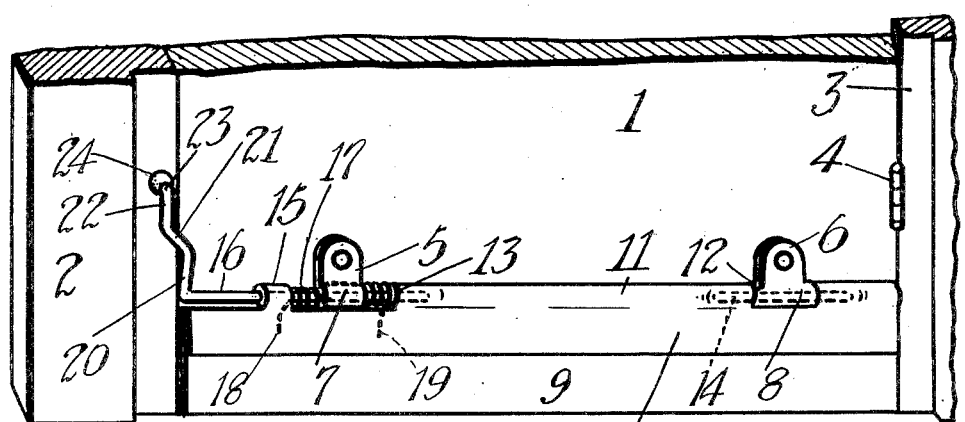
Figure 1 is a perspective view of the lower portion of the door and the door jambs and my weather strip device applied thereto.

1 indicates the lower portion of the door and 2 and 3 the door jambs. 4 indicates the door hinge. 5 and 6 are brackets secured to the door and provided with sleeve bearing ends 7 and 8. 9 indicates a strip of flexible material which forms the weather strip proper. 10 is a stiffening strip which is formed by a strip of metal doubled longitudinally of itself the portion located at the fold being formed into a longitudinally extending sleeve 11 in which are formed notches 12 and 13. The notch 12 is the same width as the sleeve portion 8 of the bracket 6 so that such bracket fits thereinto and is secured in position by a pivot pin 14. By means of the notch 13 into which the sleeve portion 7 of the bracket 5 extends I form a separate sleeve like portion 15 formed integral with the stiffening strip 10. 16 is a stiff wire which extends through the sleeve portion 15 of the stiffening strip 10 and through the sleeve portion 7 of the bracket 5 into the opposing end of the sleeve portion 11, and is clamped therein so as to turn in unison with the strip 10.

It will be seen that there is an intervening space left between the sleeve 7 and the sleeve 11 and between the sleeve 7 and the sleeve 15. 17 is a coil spring which extends around the wire 16 between the sleeves 7 and 15 and then extends back of the sleeve 7 as indicated by dotted lines in Fig. 1 and then is coiled around the wire 16 between the sleeves 7 and 11. The ends of the coil spring extend downward at 18 and 19 so as to bear against the back of the stiffening strip and exert an outward pressure thereagainst.

The outer end of the wire 16 is provided with an arm 20 the lower portion being located opposite the door adjacent to its edge the intermediate portion being offset at 21 so as to carry the portion 22 to a position opposite the door jamb 2. The outer end of the portion 22 is preferably turned inward at 23 and provided with a cushioning piece 24 so as to prevent the marring of the wood work by the operating of the arm working thereagainst.

Figure 2:
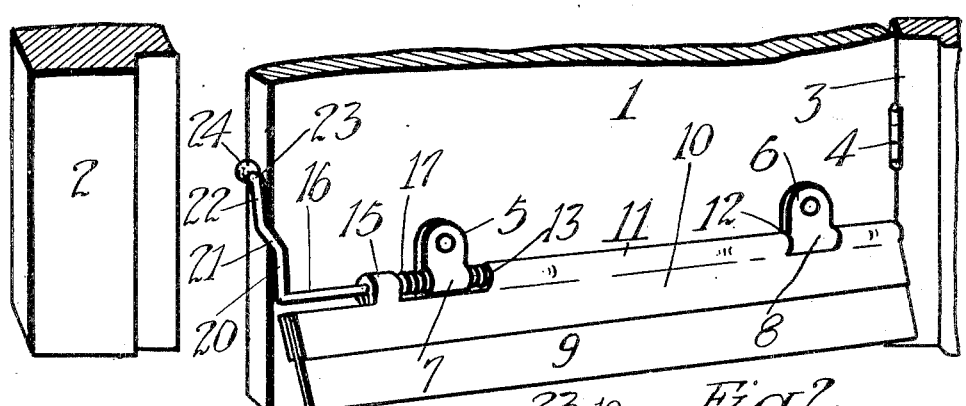
Fig. 2 is a similar view to Fig. 1 showing the door in the open position and the weather strip released from the floor.
Figures 3, 4:
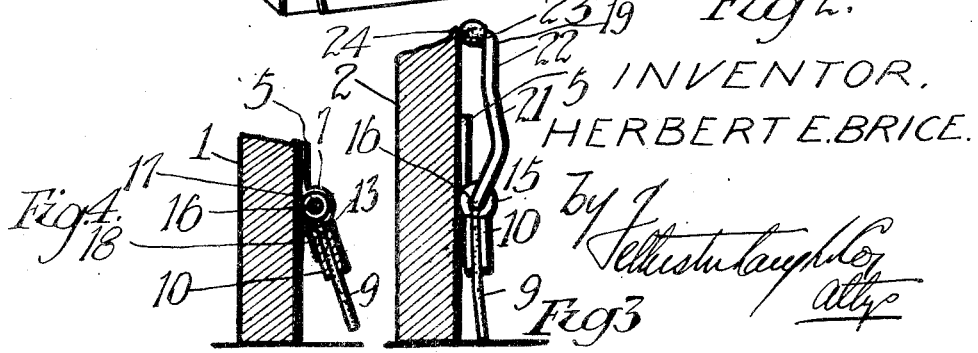
Fig. 3 is a sectional view through a portion of the door jamb showing the weather strip in end elevation.
Fig. 4 is a sectional view through a portion of the door and my weather strip device.

When the door is opened the upper end of the arm 20 is released allowing it to swing inward into the position shown in Fig. 2. The ends 18 and 19 of the spring 17 serve to force the weather strip outward clear of the floor. When the door is closed the cushion piece 24 of the outer arm portion 22 is carried into contact with the door jamb and thereby forces the weather stripping downward against the pressure of the spring 17 into contact with the floor as the door is closed.

It will, of course, be understood that the wire 16 is rigidly secured within the sleeve portions 15 and 11 so that the stiffening strip 10 turns therewith.

From this description it will be seen that I have devised a very simple means for automatically operating the weather strip of the door so that it is carried into contact with the floor as the door is closed and out of contact with the floor as the door is opened, and also such a device as will dispense with all friction and wear of the weather stripping against the floor during the opening and closing of the door.

What I claim as my invention is:

The combination with a door and a door jamb, of a pair of sleeve brackets carried upon one side of the door above the lower edge thereof, a weather strip having a sleeve-like portion cut away at different points along the length thereof to accommodate said brackets, one of the cut outs being of greater width than the bracket accommodated therein to provide space between the ends of the bracket and the ends of the cut out, a pivot rod passing through said last mentioned bracket and engaged in the sleeve like portion of the weather strip, one end of said rod extending beyond the end of the weather strip and formed into a crank arm having an integral offset disposed for engagement with the door jamb, a spring element having the intermediate portion thereof disposed behind said bracket and the ends thereof coiled about the pivot rod in the spaces between the ends of the bracket and the cut out and then extended into engagement with the weather strip, and a pivot passing through the remaining bracket and engaged in the sleeve like portion of the weather strip.

HERBERT EDWARD BRICE.